(12) United States Patent
Hu (10) Patent No.: US 12,147,268 B2
(45) Date of Patent: Nov. 19, 2024

(54) DEFORMATION CONTROL METHOD AND DEFORMATION CONTROL DEVICE FOR FLEXIBLE DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventor: Qi Hu, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 0 days.

(21) Appl. No.: 17/622,813

(22) PCT Filed: Dec. 20, 2021

(86) PCT No.: PCT/CN2021/139816
§ 371 (c)(1),
(2) Date: Dec. 25, 2021

(87) PCT Pub. No.: WO2023/103076
PCT Pub. Date: Jun. 15, 2023

(65) Prior Publication Data
US 2024/0028080 A1    Jan. 25, 2024

(30) Foreign Application Priority Data
Dec. 11, 2021   (CN) .................. 202111512634.1

(51) Int. Cl.
*G06F 1/16*    (2006.01)
*G09F 9/30*    (2006.01)
*G09G 3/00*    (2006.01)

(52) U.S. Cl.
CPC ............ *G06F 1/1652* (2013.01); *G09F 9/301* (2013.01); *G09G 3/035* (2020.08)

(58) Field of Classification Search
None
See application file for complete search history.

(56) References Cited

U.S. PATENT DOCUMENTS

2008/0083288 A1*  4/2008  Glaesemann .......... G01N 19/08
                                                                 73/849
2014/0360280 A1*  12/2014  Wu .......................... G01N 3/20
                                                                 73/763

(Continued)

FOREIGN PATENT DOCUMENTS

CN   104503546 A    4/2015
CN   104848798 A    8/2015

(Continued)

OTHER PUBLICATIONS

International Search Report in International application No. PCT/CN2021/139816, mailed on Aug. 1, 2022.

(Continued)

*Primary Examiner* — Patrick Assouad
*Assistant Examiner* — Mark A Shabman
(74) *Attorney, Agent, or Firm* — PV IP PC; Wei Te Chung (57) ABSTRACT

A deformation control method and a deformation control device for a flexible display panel are provided. The deformation control device includes an acquisition module configured for acquisition of deformation data of the flexible display panel, a comparison module configured to compare the deformation data with a deformation threshold, and a control module configured to output a control instruction according to a comparison result. The control instruction is configured to control a driving device to operate in an (Continued)

operation mode according to the control instruction, so that the flexible display panel is enabled to deform.

20 Claims, 4 Drawing Sheets

(56) References Cited

U.S. PATENT DOCUMENTS

| | | | | |
|---|---|---|---|---|
| 2015/0033870 | A1* | 2/2015 | Lee | G01N 3/20 |
| | | | | 73/849 |
| 2015/0355074 | A1 | 12/2015 | Zhou et al. | |
| 2016/0062503 | A1* | 3/2016 | Lee | G01L 1/2206 |
| | | | | 73/849 |
| 2016/0299539 | A1 | 10/2016 | Jang | |
| 2017/0102302 | A1* | 4/2017 | Gao | H10K 77/111 |
| 2019/0154555 | A1* | 5/2019 | Han | G01N 3/04 |
| 2019/0293535 | A1* | 9/2019 | Lee | G01N 3/02 |
| 2021/0239584 | A1* | 8/2021 | Agnello | G01N 3/068 |

FOREIGN PATENT DOCUMENTS

| | | |
|---|---|---|
| CN | 105094623 A | 11/2015 |
| CN | 105928810 A | 9/2016 |
| CN | 107508936 A | 12/2017 |
| CN | 108182137 A | 6/2018 |
| CN | 108267077 A | 7/2018 |
| CN | 108449489 A | 8/2018 |
| CN | 108563551 A | 9/2018 |
| CN | 109189152 A | 1/2019 |
| CN | 109844492 A | 6/2019 |
| CN | 110065220 A | 7/2019 |
| CN | 110726363 A | 1/2020 |
| CN | 110728916 A | 1/2020 |
| CN | 110853579 A | 2/2020 |
| CN | 111356967 A | 6/2020 |
| CN | 111524462 A | 8/2020 |
| CN | 112197920 A | 1/2021 |
| CN | 112947685 A | 6/2021 |
| CN | 113376014 A | 9/2021 |
| JP | 2014232041 A | 12/2014 |
| KR | 20180039797 A | 4/2018 |
| WO | 2019153112 A1 | 8/2019 |
| WO | 2020231683 A1 | 11/2020 |

OTHER PUBLICATIONS

Written Opinion of the International Search Authority in International application No. PCT/CN2021/139816, mailed on Aug. 1, 2022.

Chinese Office Action issued in corresponding Chinese Patent Application No. 202111512634.1 dated Jun. 17, 2022, pp. 1-9.

* cited by examiner

DEFORMATION CONTROL METHOD AND DEFORMATION CONTROL DEVICE FOR FLEXIBLE DISPLAY PANEL

BACKGROUND OF INVENTION

1. Field of Invention

The present application relates to a technical field of displays, and particularly to a deformation control method and a deformation control device for a flexible display panel.

2. Related Art

Stretchable displays have always been a research direction in the field of global information displays. Stretchable flexible screens produced based on this technology can achieve industry-leading large-scale deformations, such as deformability and elastic recovery in any direction, and have good light transmittance, which can effectively solve technical problems of current four-sided curvature, non-Gaussian surface fitting, and display area bending. In the future, the stretchable displays have a wide range of application prospects in wearable electronic equipment, medical health, intelligent transportation, and other fields.

However, stretchable flexible screens will inevitably endure complex external forces such as stretching during the process of stretching from a flat state to a four-curved state. The inside of the stretchable flexible screens will be stretched and deformed to varying degrees. When the stretchable flexible screens are stretched and deformed to a certain strain value, pixel display device layers in the stretchable flexible screens are extremely easily damaged, which will directly cause the stretchable flexible screens to fail to light up normally. Therefore, it is necessary to improve yields of the stretchable flexible screens in stretch forming.

SUMMARY OF INVENTION

An object of the present application is to provide a deformation control method and a deformation control device for a flexible display panel to improve a yield of the deformation of the flexible display panel.

In order to achieve the above-mentioned object, the present application provides a deformation control device for a flexible display panel, the deformation control device comprising an acquisition module configured for acquisition of deformation data of the flexible display panel; a comparison module configured to compare the deformation data with a deformation threshold; a control module configured to output a control instruction according to a comparison result. The control instruction is configured to control a driving device to operate in an operation mode according to the control instruction, so that the flexible display panel is enabled to deform.

The present application further provides a deformation control method for a flexible display panel, comprising obtaining deformation data of the flexible display panel, and comparing the deformation data with a deformation threshold and outputting a control instruction according to a comparison result. The control instruction is configured to control a driving device to operate in an operation mode according to the control instruction, so that the flexible display panel is enabled to deform.

The present application has advantageous effects as follows: the present application provides the deformation control method and the deformation control device for the flexible display panel. By obtaining the deformation data of the flexible display panel, comparing the deformation data with the deformation threshold, and outputting the control instruction according to the comparison result, the control instruction is configured to control the driving device to operate in an operation mode according to the control instruction, so that the flexible display panel is enabled to deform, and the deformation of the flexible display panel is adjusted, thereby improving the deformation yield of the flexible display panel.

DESCRIPTION OF PREFERRED EMBODIMENTS

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

Figure 1:
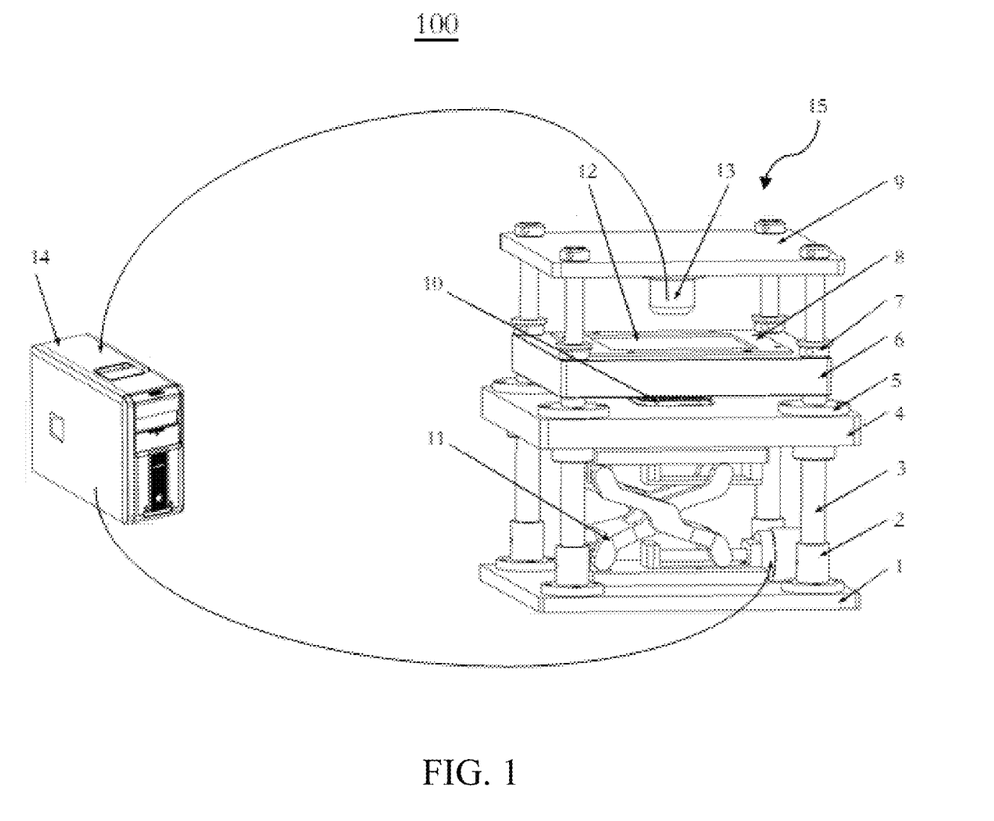
FIG. 1 is a schematic view showing when a deformation control system of a flexible display panel of the present application starts to stretch the flexible display panel.
Figure 2:
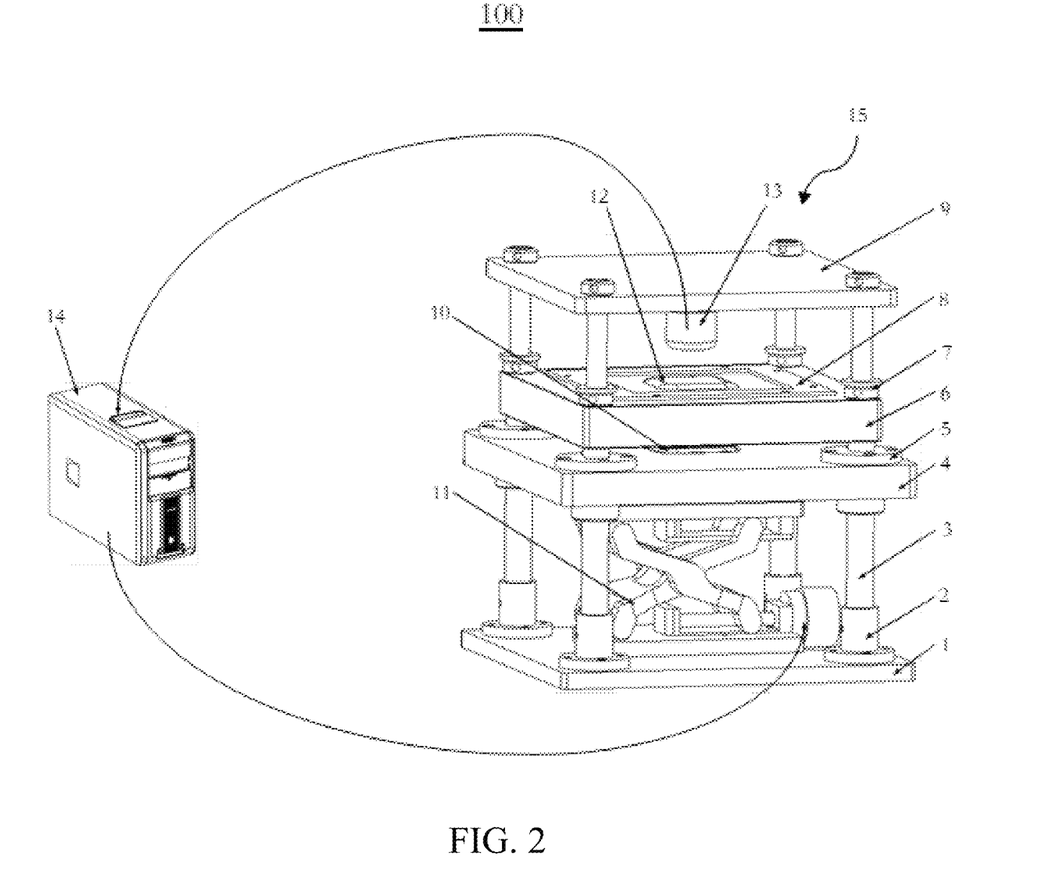
FIG. 2 is a schematic view of the deformation control system of the flexible display panel of the present application stretching the flexible display panel into a four-curved flexible display panel.

As shown in FIGS. 1 and 2, the present application provides a deformation control system 100 of a flexible display panel 12, which is applied to the flexible display panel 12 from a non-flattened state after being deformed, or is applied to the flexible display panel 12 from a non-flattened state to a flattened state after being deformed, wherein the non-flattened state includes but is not limited to a bent state or a curved state. Deformation of flexible display panel 12 includes, but is not limited to, one or more of tensile deformation, bending deformation, or torsional deformation.

In this embodiment, the flexible display panel 12 may be a flexible organic light-emitting diode display panel, a flexible micro light-emitting diode display panel, or a flexible sub-millimeter light-emitting diode display panel. The flexible display panel 12 may be a stretchable display panel, which includes a plurality of pixel islands and a hinge connected between adjacent ones of the pixel islands; the flexible display panel 12 may also be a folding display panel, which includes a non-folding part and a folding part, which are not specifically limited in this application.

Specifically, in order to describe the technical solution of the present application, the present application uses a flexible display panel as a stretchable flexible display panel, and the stretchable flexible display panel is changed from a flat state to a four-curved flexible display panel after being stretched and deformed as an example for description.

Figure 3:
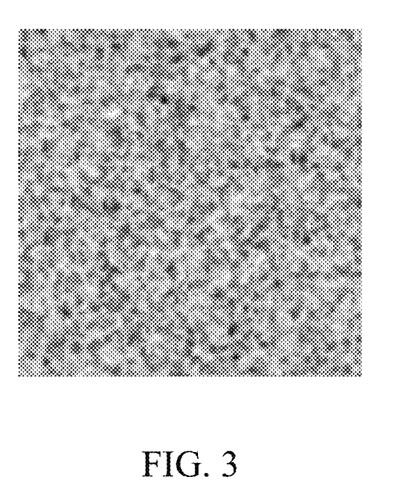
FIG. 3 is an initial speckle image of the surface of the flexible display panel according to an embodiment of the present application.

In this embodiment, the surface of the flexible display panel 12 includes speckles, and an initial speckle image of the speckles is shown in FIG. 3. During a deformation process of the flexible display panel 12, the speckles will move, and a strain during the deformation of the flexible display panel 12 is calculated according to a distance moved by the speckles, thereby to achieve real-time monitoring of the strain generated during the deformation of the flexible display panel 12 through a non-contact strain monitoring method.

Specifically, the speckles may be provided on the surface of the flexible display panel 12 in a form of a speckle coating, or may be provided on the surface of the flexible display panel 12 in a form of a speckle coating. In detail, the entire display surface of the flexible display panel 12 is provided with the speckles to monitor the overall strain during the deformation process of the flexible display panel 12.

It should be noted that the surface of the flexible display panel 12 may also be provided with strain gauges, etc., to monitor the strain during the deformation process of the flexible display panel in real time. However, compared to discretely attaching strain gauges to the surface of the flexible display panel, which can only monitor the local strain of the flexible display panel, the present application uses speckles to monitor the overall strain during the deformation process of the flexible display panel. Compared to attaching the strain gauges to the entire surface of the flexible display panel, the strain gauges tend to be damaged due to complex external forces during the deformation process of the flexible display panel, causing strain monitoring to fail. The speckles used in the present application are not easily damaged during the deformation process of the flexible display panel, so as to ensure that the strain monitoring can be performed normally during the entire deformation process of the flexible display panel. In addition, a manufacturing process of setting the speckles on the flexible display panel is simple, which is beneficial to simplify preparation work for strain monitoring.

In this embodiment, the deformation control system 100 of the flexible display panel 12 includes a deformation control device 14, a deformation forming device 15, and an imaging device 13. The deformation control device 14 is connected to the deformation forming device 15 and the imaging device 13. The deformation control device 14, the deformation forming device 15, and the imaging device 13 can be integrated on one device. Specifically, part of the deformation control device 14 can be integrated into the deformation forming device 15, or all the deformation control device 14 can be integrated into the deformation type device 15. The deformation control device 14, the deformation forming device 15, and the imaging device 13 may also be installed on different devices, respectively.

In this embodiment, as shown in FIGS. 1 and 2, the deformation forming device 15 is a four-curved surface forming machine. The four-curved surface forming machine includes a platform base 1, a support 2, a support shaft 3, a profiling plate 4, a linear bearing 5, a guide plate 6, a fastener 7, a pressing plate 8, a fixed plate 9, a thimble assembly 10, and a driving device 11, wherein the driving device 11 is a motor. The support shaft 3 is constrained to the platform base 1 through the support 2, the profiling plate 4 slides freely on the support shaft 3 through the linear bearing 5, the guide plate 6 is constrained to the support shaft 3 by the fastener 7, the pressing plate 8 is set on the guide plate 6, the fixed plate 9 is arranged above the guide plate 6 through the support shaft, and the driving device 11 is installed on the platform base 1.

Specifically, when the four-curved surface forming machine needs to stretch the flat flexible display panel into a four-curved flexible display panel, the flexible display panel 12 is constrained to the guide plate 6 by the pressing plate 8. An action sequence of the four-curved surface forming machine to stretch the flexible display panel 12 is: (1) the driving device 11 lifts the profiling plate 4 upward; (2) the profiling plate 4 in the upward movement pushes the thimble assembly 10 upward; (3) The thimble assembly 10 performs four-curved-curved stretch forming on the flexible display panel 12.

It should be noted that the deformation forming device 15 may also be other deformation devices, such as a folding forming device.

In this embodiment, the imaging device 13 is provided on the deformation forming device 15. The imaging device 13 is a camera. In the process of stretching the flexible display panel 12 into the four-curved flexible display panel, the imaging device 13 can perform real-time video recording or real-time photographing of the flexible display panel 12 to record the stretching and forming process of the flexible display panel 12.

Specifically, the imaging device 13 is fixed below the fixing plate 9 and above the pressing plate 8. Prior to stretching the flexible display panel 12, the imaging device 13 takes a photograph of the entire surface of the flexible display panel 12 provided with the speckles to obtain an initial speckle image, which includes initial speckle data. In the process of stretching the flexible display panel 12 into the four-curved flexible display panel by the four-curved molding machine, the imaging device 13 takes real-time photographs of the entire surface of the flexible display panel 12 provided with the speckles to obtain real-time deformed speckle images, which include real-time deformed speckle data.

Figure 4:
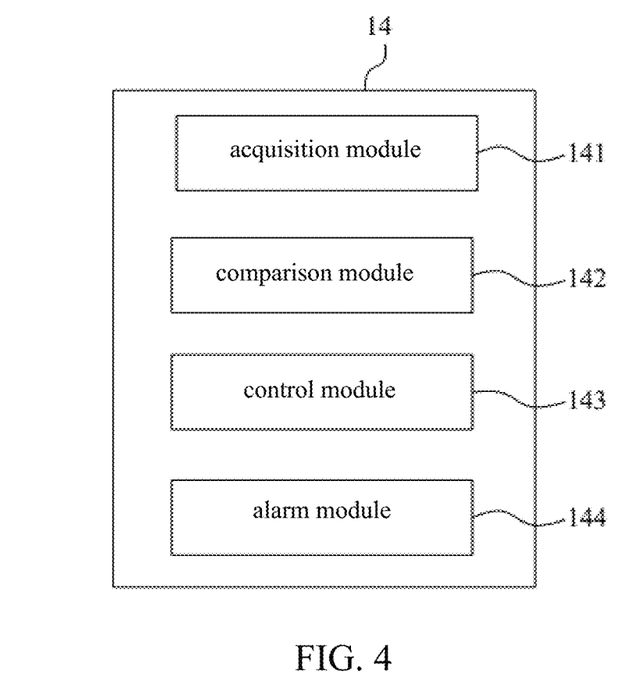
FIG. 4 is a schematic view of a framework of the deformation control device according to an embodiment of the present application.

In this embodiment, the deformation control device 14 and the imaging device 13 may be electrically connected through a wire or through a wireless network communication. As shown in FIG. 4, the deformation control device 14 includes an acquisition module 141, a comparison module 142, a control module 143, and an alarm module 144.

In this embodiment, the acquisition module 141 is configured to obtain deformation data of the flexible display panel 12. Specifically, the deformation data contains strain data during the deformation process of the flexible display panel. It can be understood that the deformation data may also include stress or deformation data during the deformation process of the flexible display panel 12.

Specifically, the acquisition module 141 is configured for obtaining initial speckle data and deformed speckle data of the surface of the flexible display panel. The acquisition module 141 is further configured to calculate displacement data from the deformed speckle data and the initial speckle data, and to obtain the strain data according to the displacement data. The strain data includes a maximum strain. Specifically, the maximum strain represents a maximum strain that occurs during the deformation of the flexible display panel.

It should be noted that after the imaging device 13 obtains the initial speckle image and the real-time deformed speckle image, the imaging device 13 transmits the initial speckle image and the real-time deformed speckle image to the acquisition module 141 via a wire or wireless network, so that the acquisition module 141 acquires the initial speckle data and the deformed speckle data of the surface of the flexible display panel 12. Next, the acquisition module 141 calculates the real-time deformed speckle data and the initial speckle data to obtain the real-time displacement data of the speckles. Converting the real-time displacement data into real-time strain data can obtain real-time strain data during the deformation process of the flexible display panel.

In this embodiment, the comparison module 142 is configured to compare the deformation data with a deformation threshold. The strain data includes the maximum strain. The deformation threshold includes a fracture strain threshold, which corresponds to a critical strain corresponding to a fracture of the flexible display panel 12 during the deformation process. If the maximum strain value during the deformation of the flexible display panel 12 exceeds the fracture strain threshold, the flexible display panel 12 will be broken and cannot be displayed. Specifically, the fracture strain threshold is greater than or equal to 8% and less than or equal to 12%. For example, the fracture strain threshold is 8%, 9%, 10%, or 12%.

Specifically, the comparison module 142 is configured to compare the maximum strain with the fracture strain threshold to monitor whether the flexible display panel 12 is broken during the deformation process of the flexible display panel 12.

In this embodiment, the control module 143 is configured to output a control instruction according to a comparison result. The control instruction is configured to control the driving device 11 to operate in an operation mode according to the control instruction, so that the flexible display panel 12 is enabled to deform.

Specifically, the control module 143 is configured to output a fracture control instruction if the maximum strain is greater than or equal to the fracture strain threshold. The fracture control instruction is configured to control the driving device 11 to stop driving the flexible display panel 12 to deform.

In addition, an alarm module 144 is configured to issue a fracture alarm instruction to remind that the flexible display panel 12 is broken if the maximum strain is greater than or equal to the fracture strain threshold.

In this embodiment, the deformation threshold includes a critical strain threshold, which is less than the fracture strain threshold. The critical strain threshold corresponds to a critical strain value close to a fracture during the deformation process of the flexible display panel 12, and if a strain exceeds the critical strain threshold, the risk of fracture of the flexible display panel 12 increases. Specifically, the critical strain threshold is greater than or equal to 4% and less than 8%. For example, the critical strain threshold is 4.5%, 5%, 6%, 7%, or 7.5%.

Specifically, if the maximum strain is less than the fracture strain threshold, the comparison module 142 is further configured to compare the maximum strain with the critical strain threshold to determine whether the deformed flexible display panel 12 is at risk of fracture.

The control module 143 is further configured to output a critical control instruction if the maximum strain is greater than or equal to the critical strain threshold. The critical control instruction is configured to control the driving device 11 to slow down to a target speed to enable the flexible display panel to deform. The control module 143 is further configured to output a safety control instruction if the maximum strain is less than the critical strain threshold. The safety control instruction is configured to control the driving device to maintain an original speed so that the flexible display panel is enabled to deform.

Specifically, when the flexible display panel 12 starts to be stretched, the driving device 11 moves upward at an initial speed to drive the flexible display panel 12 to deform. After the driving device 11 receives the critical control instruction sent by the control module 143, the driving device 11 is reduced from the initial speed to the target speed, so as to reduce the risk of breaking the flexible display panel 12. Specifically, the initial speed is taken as an original speed, and its ratio to the target speed is $m^n$, wherein m is an integer greater than or equal to 2, and n is an integer greater than or equal to 1, so that the target speed decreases exponentially with respect to the original speed, which further reduces the risk of fracture of the deformed flexible display panel.

Specifically, the critical strain threshold includes a first critical strain threshold and a second critical strain threshold, and the second critical strain threshold is greater than the first critical strain threshold and less than the fracture strain threshold. The first critical strain threshold may be greater than or equal to 4% and less than 6%, and the second critical strain threshold may be greater than or equal to 6% and less than 8%. The target speed includes a first target speed and a second target speed, and the second target speed is less than the first target speed.

When the maximum strain is greater than or equal to the first critical strain threshold and is less than the second critical strain threshold, the control module 143 is further configured to output a first critical control instruction. The first critical control instruction is configured to control the driving device 11 to slow down to the first target speed to enable the flexible display panel 12 to deform. When the maximum strain is greater than the second critical strain threshold and is less than the fracture strain threshold, the control module 143 is further configured to output a second critical control instruction. The second critical control instruction is configured to control the driving device 11 to slow down to the second target speed to enable the flexible display panel to deform.

Specifically, when the maximum strain is greater than the first critical strain threshold, the control module 143 outputs the first critical control instruction to the driving device 11, and the driving device 11 decelerates from the initial speed, which is the first original rate, to the first target speed according to the first critical control instruction to enable the flexible display panel 12 to deform, thereby reducing the risk of the deformed flexible display panel 12 being further deformed and broken. When the maximum strain is greater than the second critical strain threshold and less than the fracture strain threshold, the control module 143 is further configured to output a second critical control instruction to the driving device 11, so that the driving device 11 decelerates from the first target speed, which is then taken as a second original speed, to the second target speed according to the second critical control instruction to enable the flexible display panel 12 to deform, thereby further reducing the risk of the deformed flexible display panel 12 being further deformed and broken.

It should be noted that, in addition to the first critical strain threshold and the second critical strain threshold, the critical strain threshold may also include a third critical strain threshold and a fourth critical strain threshold. Correspondingly, the target speed further includes a third target speed corresponding to the third critical strain threshold, and a fourth target speed corresponding to the fourth critical strain threshold, so that when the deformed flexible display panel is in a critical state, the flexible display panel 12 is driven to deform. A moving speed of the driving device 11 shows a gradient drop, which further reduces the risk of fracture of the flexible display panel in a critical state.

In addition, it should be noted that the control module 143 in this embodiment may be a proportion-integral-derivative (PID) controller, which controls the speed of a motor based on a proportion, integral, and derivative of errors generated by the comparison between the real-time strain data and the deformation threshold.

Figure 5:
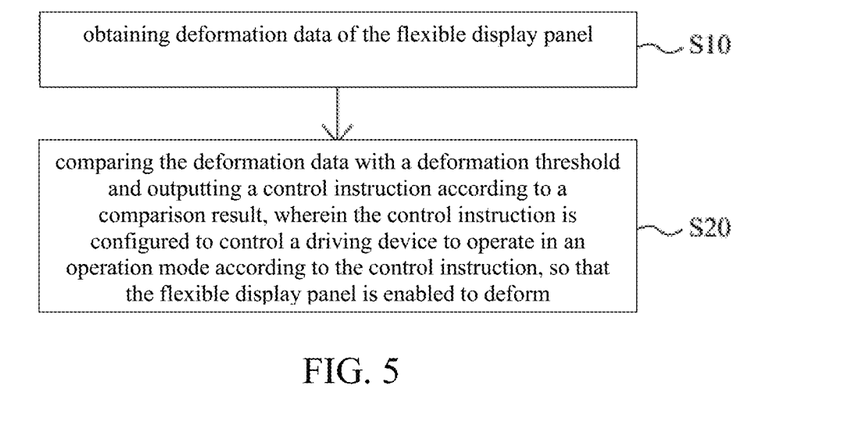
FIG. 5 is a schematic flowchart of a deformation control method of the flexible display panel of the present application.

As shown in FIG. 5, FIG. 5 is a schematic flowchart of a deformation control method of the flexible display panel of the present application.

Step S10: obtain deformation data of the flexible display panel.

Specifically, initial speckle data and deformed speckle data of the surface of the flexible display panel 12 are obtained. The deformed speckle data and the initial speckle data are calculated to obtain the displacement data, and the strain data is obtained according to the displacement data. The strain data contains a maximum strain.

Step S20: compare the deformation data with a deformation threshold and output a control instruction according to a comparison result. The control instruction is configured to control a driving device to operate in an operation mode according to the control instruction, so that the flexible display panel is enabled to deform.

Specifically, the deformation threshold includes a fracture strain threshold and a critical strain threshold, and the critical strain threshold is less than the fracture strain threshold. The maximum strain is compared with the fracture strain threshold to monitor whether the deformed flexible display panel is broken. The maximum strain is compared with the critical strain threshold to monitor whether the deformed flexible display panel is at risk of fracture.

If the maximum strain is greater than or equal to the fracture strain threshold, the fracture control instruction is output. The fracture control instruction is configured to control the drive device to stop driving the flexible display panel to deform, and at the same time, issue a fracture alarm instruction.

If the maximum strain is less than the fracture strain threshold, compare the maximum strain with the critical strain threshold;

If the maximum strain is greater than or equal to the critical strain threshold, a critical control instruction is output. The critical control instruction is configured to control the driving device to slow down to the target speed to enable the flexible display panel to deform; if the maximum strain is less than the critical strain threshold, a safety control instruction is output. The safety control instruction is configured to control the driving device to maintain the original speed to enable the flexible display panel to deform.

Specifically, the critical strain threshold includes a first critical strain threshold and a second critical strain threshold. The second critical strain threshold is greater than the first critical strain threshold and less than the fracture strain threshold. The target speed includes a first target speed and a second target speed, and the second target speed is less than the first target speed.

When the maximum strain is greater than or equal to the first critical strain threshold and is less than the second critical strain threshold, a first critical control instruction is output. The first critical control instruction is configured to control the driving device to slow down to the first target speed to enable the flexible display panel to deform.

When the maximum strain is greater than the second critical strain threshold and less than the fracture strain threshold, a second critical control instruction is output. The second critical control instruction is configured to control the driving device to slow down to a second target speed to enable the flexible display panel to deform.

The present application further provides a computer device, which may be a terminal or a server. The computer device includes a processor having one or more processors, a memory having one or more computer-readable storage media, and a computer program stored in the memory and running on the processor. Specifically, the processor is electrically connected to the memory. Those skilled in the art can understand that the structure of the computer device shown in the figure does not constitute a limitation on the computer device, and may include more or less components than those shown in the figure, or a combination of certain components, or different component arrangements.

The processor is the control center of the computer equipment. It uses various interfaces and lines to connect the various parts of the entire computer equipment, by running or loading software programs (computer programs) and/or modules stored in the memory, and calling data, perform various functions of computer equipment and process data, so as to monitor the computer equipment as a whole.

In the embodiment of the present application, the processor in the computer device loads the instructions corresponding to the process of one or more application programs into the memory according to the following steps, and the processor runs the application programs stored in the memory in order to achieve various functions:

Obtain deformation data of the flexible display panel; the deformation data is compared with the deformation threshold, and a control instruction is output according to the comparison result. The control instruction is configured to control the driving device operate in an operation mode according to the control instruction, so that the flexible display panel is enabled to deform.

For the specific implementation of the above operations, please refer to the previous embodiments, which will not be repeated here.

The descriptions of the above embodiments are only used to help understand the technical solutions and core ideas of this application; those of ordinary skill in the art should understand that: they can still modify the technical solutions described in the foregoing embodiments, or equivalently replace some of the technical features; and these modifications or replacements do not divorce the essence of the corresponding technical solutions The scope of the technical solution of each embodiment of the present application.

What is claimed is:

1. A deformation control device for a flexible display panel, the deformation control device comprising:
   an acquisition module configured for acquisition of deformation data of the flexible display panel;
   a comparison module configured to compare the deformation data with a deformation threshold;
   a control module configured to output a control instruction according to a comparison result, wherein the control instruction is configured to control a driving device to operate in an operation mode according to the control instruction, so that the flexible display panel is enabled to deform;
   wherein the deformation data contains strain data containing a maximum strain, and the deformation threshold comprises a fracture strain threshold and a critical strain threshold, and the critical strain threshold is less than the fracture strain threshold; the control module is further configured to output a critical control instruction based on the maximum strain being greater than or equal to the critical strain threshold, and the critical control instruction is configured to control the driving device to slow down to a target speed so that the flexible display panel is enabled to deform.

2. The deformation control device for the flexible display panel of claim 1, wherein a surface of the flexible display panel comprises speckles, the deformation data contains strain data; and the acquisition module is configured to obtain initial speckle data and deformed speckle data of the surface of the flexible display panel, to obtain displacement data by calculating the deformed speckle data and the initial speckle data, and to obtain the strain data according to the displacement data.

3. The deformation control device for the flexible display panel of claim 2, wherein the surface of the flexible display panel is provided with a speckle film comprising the speckles, or a speckle coating comprising the speckles.

4. The deformation control device for the flexible display panel of claim 1, the comparison module is further configured to compare the maximum strain with the fracture strain threshold; and the control module is configured to output a fracture control instruction if the maximum strain is greater than or equal to the fracture strain threshold, wherein the fracture control instruction is configured to control the driving device to stop driving the flexible display panel to deform.

5. The deformation control device for the flexible display panel of claim 4, wherein based on the maximum strain being less than the fracture strain threshold, the comparison module is further configured to compare the maximum strain with the critical strain threshold; and wherein the control module is further configured to output a safety control instruction based on the maximum strain being less than the critical strain threshold, and the safety control instruction is configured to control the driving device to maintain an original speed so that the flexible display panel is enabled to deform.

6. The deformation control device for the flexible display panel of claim 5, wherein the critical strain threshold comprises a first critical strain threshold and a second critical strain threshold, the second critical strain threshold being greater than the first critical strain threshold and less than the fracture strain threshold; and the target speed comprising a first target speed and a second target speed, and the second target speed being less than the first target speed;

wherein based on the maximum strain being greater than or equal to the first critical strain threshold and less than the second critical strain threshold, the control module is further configured to output a first critical control instruction, and the first critical control instruction is configured to control the driving device to slow down to the first target speed so that the flexible display panel is enabled to deform;

wherein based on the maximum strain being greater than the second critical strain threshold and less than the fracture strain threshold, the control module is further configured to output a second critical control instruction, and the second critical control instruction is configured to control the driving device to slow down to the second target speed so that the flexible display panel is enabled to deform.

7. The deformation control device for the flexible display panel of claim 5, wherein a ratio of the original speed to the target speed is $m^n$, m is an integer greater than or equal to 2, and n is an integer greater than or equal to 1.

8. The deformation control device for the flexible display panel of claim 4, wherein the deformation control device further comprises:

an alarm module configured to issue a fracture alarm instruction based on the maximum strain being greater than or equal to the fracture strain threshold.

9. The deformation control device for the flexible display panel of claim 1, wherein the flexible display panel is selected from any one of a flexible organic light-emitting diode display panel, a flexible micro light-emitting diode display panel, and a flexible sub- millimeter light-emitting diode display panel.

10. The deformation control device for the flexible display panel of claim 1, wherein the deformation of the flexible display panel comprises one or more of tensile deformation, bending deformation, or torsional deformation.

11. A deformation control method for a flexible display panel, comprising:

obtaining deformation data of the flexible display panel;

comparing the deformation data with a deformation threshold and outputting a control instruction according to a comparison result, wherein the control instruction is configured to control a driving device to operate in an operation mode according to the control instruction, so that the flexible display panel is enabled to deform;

wherein the deformation data contains strain data containing a maximum strain, and the deformation threshold comprises a fracture strain threshold and a critical strain threshold, and the critical strain threshold is less than the fracture strain threshold; the step of comparing the deformation data with the deformation threshold and outputting the control instruction according to the comparison result further comprises:

outputting a critical control instruction if the maximum strain is greater than or equal to the critical strain threshold, wherein the critical control instruction is configured to control the driving device to slow down to a target speed so that the flexible display panel is enabled to deform.

12. The deformation control method for the flexible display panel of claim 11, wherein a surface of the flexible display panel comprises speckles, the deformation data contains strain data; and the step of obtaining the deformation data of the flexible display panel comprises the following steps:

obtaining initial speckle data and deformed speckle data of the surface of the flexible display panel;

obtaining, by calculating the deformed speckle data and the initial speckle data, displacement data, and obtaining the strain data according to the displacement data.

13. The deformation control method for the flexible display panel of claim 11, wherein the step of comparing the deformation data with the deformation threshold and outputting the control instruction according to the comparison result comprises:

comparing the maximum strain with the fracture strain threshold; and outputting a fracture control instruction if the maximum strain is greater than or equal to the fracture strain threshold, wherein the fracture control instruction is configured to control the driving device to stop driving the flexible display panel to deform.

14. The deformation control method for the flexible display panel of claim 13,
wherein the step of comparing the deformation data with the deformation threshold and outputting the control instruction according to the comparison result further comprises:
comparing the maximum strain with the critical strain threshold if the maximum strain is less than the fracture strain threshold; and
outputting a safety control instruction based on the maximum strain being less than the critical strain threshold, wherein the safety control instruction is configured to control the driving device to maintain an original speed so that the flexible display panel is enabled to deform.

15. The deformation control method for the flexible display panel of claim 14, wherein the critical strain threshold comprises a first critical strain threshold and a second critical strain threshold, and the second critical strain threshold being greater than the first critical strain threshold and less than the fracture strain threshold;
the target speed comprising a first target speed and a second target speed, and the second target speed being less than the first target speed;
wherein based on the maximum strain being greater than or equal to the first critical strain threshold and less than the second critical strain threshold, a first critical control instruction is output to control the driving device to slow down to the first target speed so that the flexible display panel is enabled to deform; and
wherein based on the maximum strain being greater than the second critical strain threshold and less than the fracture strain threshold, a second critical control instruction is output to control the driving device to slow down to the second target speed so that the flexible display panel is enabled to deform.

16. The deformation control method for the flexible display panel of claim 13, further comprising:
issuing a fracture alarm instruction based on the maximum strain being greater than or equal to the fracture strain threshold.

17. The deformation control method for the flexible display panel of claim 11, wherein the flexible display panel is selected from any one of a flexible organic light-emitting diode display panel, a flexible micro light-emitting diode display panel, and a flexible sub-millimeter light-emitting diode display panel.

18. The deformation control method for the flexible display panel of claim 11, wherein the deformation of the flexible display panel comprises one or more of tensile deformation, bending deformation, or torsional deformation.

19. A deformation control system for a flexible display panel, comprising a deformation control device, a deformation forming device, and an imaging device; wherein the deformation control device is connected to the deformation forming device and the imaging device;
wherein the the deformation control device comprises:
an acquisition module configured for acquisition of deformation data of the flexible display panel;
a comparison module configured to compare the deformation data with a deformation threshold;
a control module configured to output a control instruction according to a comparison result, wherein the control instruction is configured to control a driving device to operate in an operation mode according to the control instruction, so that the flexible display panel is enabled to deform;
wherein the deformation data contains strain data containing a maximum strain, and the deformation threshold comprises a fracture strain threshold and a critical strain threshold, and the critical strain threshold is less than the fracture strain threshold; the control module is further configured to output a critical control instruction based on the maximum strain being greater than or equal to the critical strain threshold, and the critical control instruction is configured to control the driving device to slow down to a target speed so that the flexible display panel is enabled to deform.

20. The deformation control system for the flexible display panel of claim 19, the deformation control device and the imaging device are electrically connected through a wire or through a wireless network communication.

* * * * *